United States Patent [19]

Zollinger

[11] 4,215,260

[45] Jul. 29, 1980

[54] APPARATUS FOR WELDING TWO PROFILE OR SECTION RODS BY MEANS OF RESISTANCE WELDING, ESPECIALLY FOR WELDING TWO RAILS

[75] Inventor: Hans-Rudolf Zollinger, Geroldswil, Switzerland

[73] Assignee: H. A. Schlatter AG, Schlieren, Switzerland

[21] Appl. No.: 937,559

[22] Filed: Aug. 28, 1978

[30] Foreign Application Priority Data

Sep. 9, 1977 [CH] Switzerland ..................... 11042/77

[51] Int. Cl.$^2$ ............................................. B23K 11/02
[52] U.S. Cl. ....................................... 219/53; 219/55; 219/101
[58] Field of Search ............................ 219/101, 53, 55

[56] References Cited

U.S. PATENT DOCUMENTS

| | | | |
|---|---|---|---|
| 3,541,295 | 1/1970 | McGuire | 219/101 |
| 3,982,091 | 9/1976 | Zollinger | 219/101 |

*Primary Examiner*—E. A. Goldberg

*Attorney, Agent, or Firm*—Werner W. Kleeman

[57] ABSTRACT

An apparatus for welding two profile or section rods by means of electrical resistance welding, especially an apparatus for welding two rails. There is provided for each of the profile or section rods a clamping device having contact electrodes for infeeding the welding current. Both of the clamping devices are displaceable relative to one another in the direction of the profile or section rods, in order to exert a pressure force at the weld joint. To prevent distortion or displacement of the end regions of the profile sections directly neighboring the weld joint, a centering device is arranged between both of the clamping devices. This centering device can be brought into engagement with the end section of both the one as well as the other profile rod and fixedly retains such end sections. The centering device can comprise two similarly constructed pivotal arms rotatable about a common centering shaft. The pivotal arms each having a centering mouth at their free end, the form of which is essentially matched to the profile or contour of the profile or section rods which are to be welded together.

10 Claims, 5 Drawing Figures

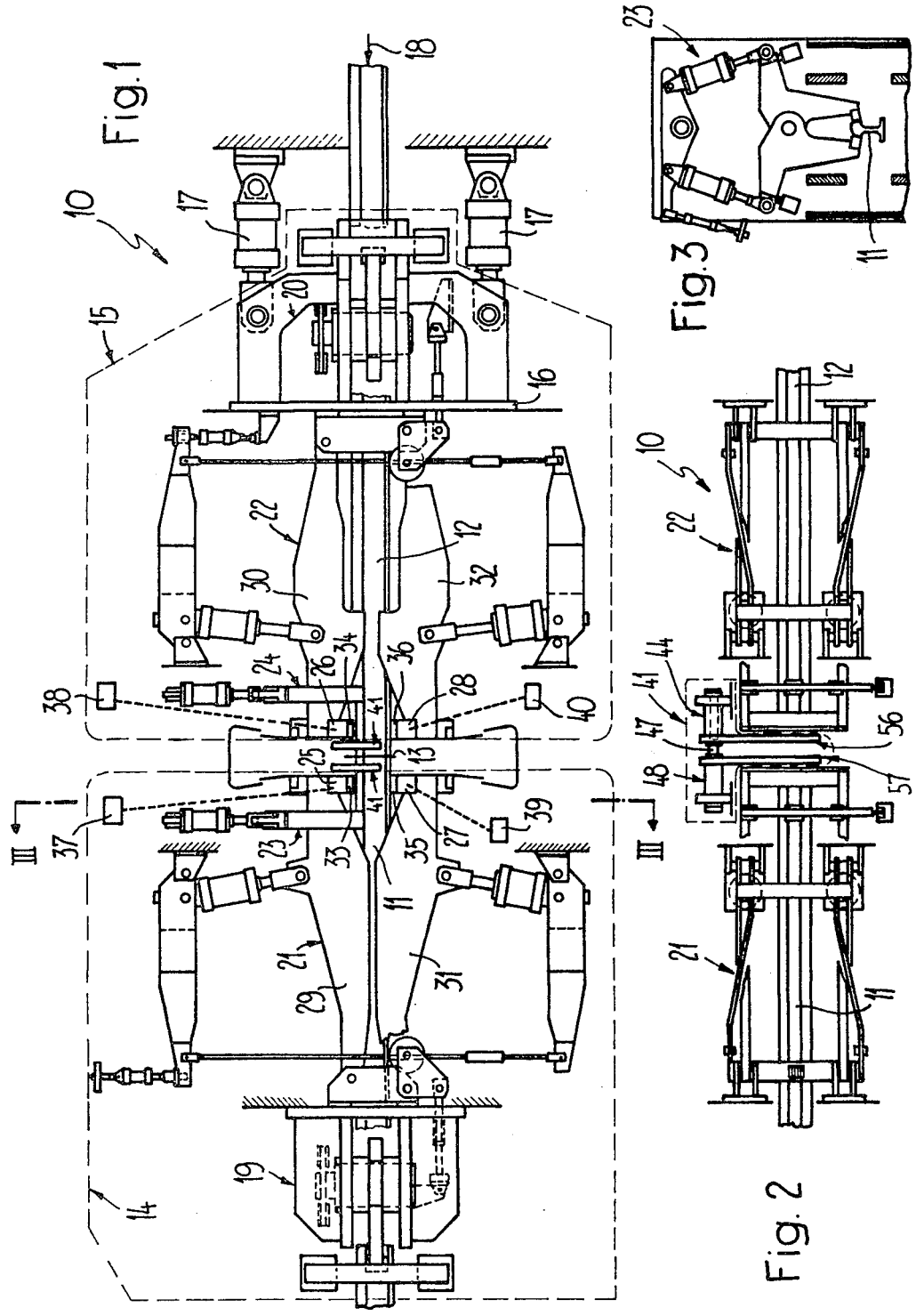

APPARATUS FOR WELDING TWO PROFILE OR SECTION RODS BY MEANS OF RESISTANCE WELDING, ESPECIALLY FOR WELDING TWO RAILS

BACKGROUND OF THE INVENTION

The present invention relates to a new an improved construction of apparatus for welding together two profile or section rods, by means of resistance welding, especially for welding together two rails, which apparatus is of the type comprising clamping devices operatively associated with each of the profile rods and having contact electrodes for the infeed of the welding current and means in order to displace the clamping devices relative to one another in the direction of the profile rods, to thereby exert a pressure force at the weld or welding joint.

It is known for such machines to construct the clamping devices to be displaceable and also rotatable to a limited degree in a plane which is at right angles to the lengthwise extent of the profile or section rods to be interconnected, in order to be able to mutually align the profile or contour of both profile or section rods prior to welding.

Since, however, such profile or section rods, as a general rule, constitute rolled profiles, and thus, automatically are associated with comparatively large manufacturing tolerances, and furthermore, since it is practically impossible to avoid that the end faces of the profile or section rods to be welded together are not exactly at right angles or perpendicular to their lengthwise axis, during the actual welding operation and also during the application of the pressure force at the welding joint there occurs so-called "distortions" or "displacements" of both profile rods in relation to one another. Under the term "distortion" or "displacement" as used in this context there should be understood the phenomena occurring, under such circumstances, during the welding operation in terms of both abutting or impact surfaces participating in the welding operation mutually shifting under simultaneous plastic deformation and deviation from the profile axis of both end regions of the profile or section rods which directly adjoin the welding joint.

When this phenomenon occurs, apart from the deburring of the welding joint which is required in any case, there is either necessitated a complicated post-machining operation at the region of the welding joint, or, however, the welding joint itself must again be disconnected and a new welding operation performed.

SUMMARY OF THE INVENTION

Therefore, with the foregoing in mind, it is a primary object of the present invention to provide a new and improved construction of apparatus of the previously mentioned type which extensively enables avoiding the aforementioned drawbacks.

Still a further significant object of the present invention is directed to a new and improved construction of apparatus for welding together two profile or section members by means of resistance welding, especially for welding together two rails, in an extremely accurate and reliable manner, which apparatus is relatively simple in construction and design, economical to manufacture, extremely reliable in performance and not readily subject to breakdown or malfunction.

A further significant object of the present invention is to devise novel apparatus for welding together parts in the form of profile members, also referred to as profile or section rods, while avoiding the undesirable distortion or displacement of the end portions of the profile members which, otherwise as explained above, would require extensive post-machining work or destruction of the accomplished weld and a rewelding operation.

Now in order to implement these and still further objects of the invention, which will become more readily apparent as the description proceeds, the apparatus at the present development is manifested by the features that between the clamping devices there is arranged a centering device which can be brought into engagement with both abutting ends of the profile rods or members, in order to retain in mutual alignment, during the welding operation and the subsequent cooling time, the profiles or contours of both ends of such profile members at the direct neighbourhood of the welding joint.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic and simplified side view of a welding machine especially suitable for welding rails and constructed according to the teachings of the present invention;

FIG. 2 is a top plan view of part of the machine shown in FIG. 1;

FIG. 3 is a simplified sectional view of the welding machine shown in FIG. 1, taken substantially along the line III—III thereof;

DETAILED DESCRIPTION OF THE PREFERRED EMBODIMENTS

Figure 4:
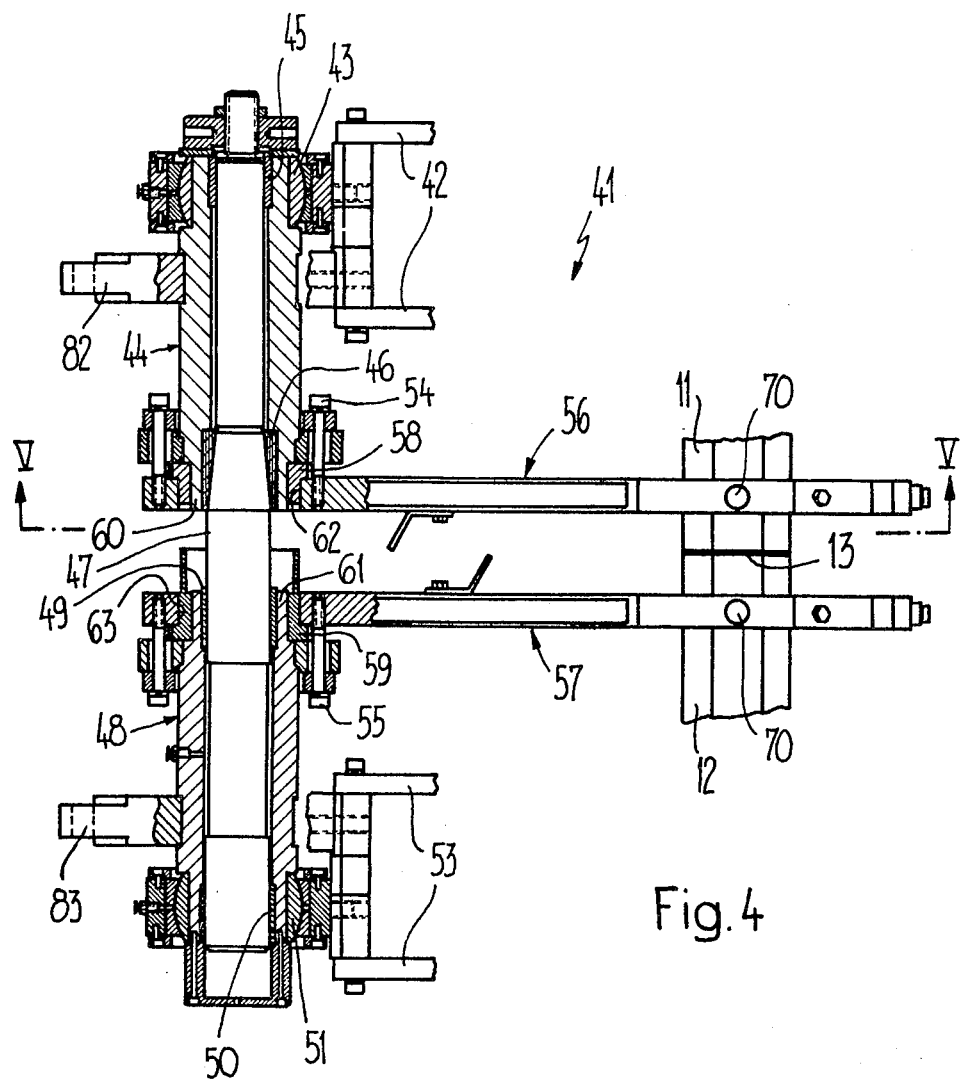
FIG. 4 is a sectional view of the simply schematically illustrated centering device of FIGS. 1 and 2, however, shown on an enlarged scale and in a position rotated through 90° in comparison to the showing of FIG. 2.

Describing now the drawings, the equipment 10 which has been illustrated in FIGS. 1 to 3 in the form of a rail welding machine, by way of example, contains at least as concerns the clamping devices and the associated hydraulic actuation elements as well as the contact electrodes and the related electrical parts, equipment of the type, for instance, disclosed in detail in German patent publication No. 2,546,210, published Apr. 29, 1976 and the commonly assigned, cognate U.S. Pat. No. 3,982,091, granted Sept. 21, 1976, to which reference may be readily had and the disclosure of which is incorporated herein by reference. Therefore, for purposes of simplification at this portion of the disclosure there will only be generally described enough of the afore-mentioned equipment to enable those skilled in the art to readily understand the underlying principles and concepts of the present development.

By referring to FIGS. 1 and 2 there will be seen two profile or section members—sometimes referred to herein as profile or section rods—in the form of two rail sections 11 and 12 which are to be welded together at the welding joint generally designated by reference character 13. Operatively associated with the rail section 11 is a clamping device, generally designated by reference character 14 and enclosed in a phantom line block in FIG. 1, and a similarly constructed clamping device or assembly 15 is associated with the rail section 12 and likewise enclosed in a phantom line block of the showing of FIG. 1. Whereas the clamping device or assembly 14 is arranged to be non-displaceable in the lengthwise direction of the rail sections 11 and 12, the other clamping device or assembly 15 is mounted at a merely schematically indicated frame 16 which is displaceable in the lengthwise direction of the rails or rail sections 11 and 12. For this purpose there are employed two rather powerful hydraulic units 17, which, in turn are stationarily supported at one end. In this way it is possible during the welding operation and directly thereafter to exert at the rail section 12 and thus at the welding joint 13 a pressure force which is effective in the direction of the arrow 18.

It has already been mentioned, and furthermore has also been explained in the afore-mentioned patents, the clamping device or assembly 14 and the clamping device or assembly 15 are similarly constructed. In particular, each clamping device 14 and 15 possesses a horizontal clamping press 19 and 20 which is effective at the rail web, and, arranged subsequent thereto in the direction of the welding joint 13, a vertical clamping press 21 and 22, respectively, which is effective at the rail base and at the top side of the rail head as well as a further horizontal clamping press 23 and 24, respectively, which is effective at the sides of the rail head, as also seen by referring to FIG. 3.

As described in the afore-mentioned patents and as also will be understood by one skilled in the art from the illustration of FIGS. 1 and 3, alignment errors of both rail sections 11 and 12 can be corrected in particular by means of the vertical clamping presses 21 and 22 and by means of the horizontal clamping presses 23 and 24 in vertical and horizontal direction, respectively, so that the components or parts 21 to 24, apart from their function of fixedly clamping, also carry out an alignment function.

The clamping jaws 25, 27 and 26, 29 at the ends of the clamping levers 29, 31 and 30, 32 of the vertical clamping presses 21 and 22, respectively, are equipped with contact electrodes 33, 35 and 34, 36, respectively, which, in turn, as schematically indicated, are connected to a suitable welding current source 37, 39 and 38, 40, respectively.

Between the clamping device 14 and the clamping device 15 there is arranged a centering device or mechanism 41 which has only been schematically shown in FIGS. 1 and 2 and, in FIG. 2 in particular, enclosed within the phantom line block. This centering device or mechanism 41 can be brought into operative engagement with the end regions of the rail sections 11 and 12 and which end regions directly adjoin or neighbour the welding joint 13. In this way it is possible to effectively retain in mutual alignment the end regions i.e. the forms or contours of the end regions of such rail sections 11 and 12 during the welding operation.

Figure 5:
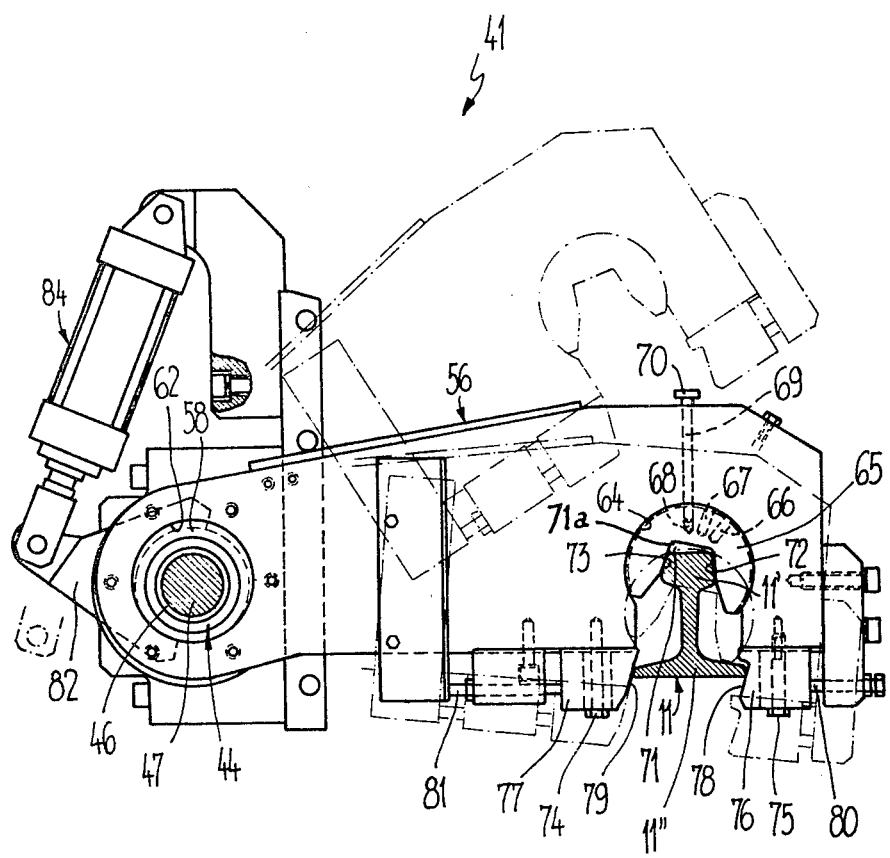
FIG. 5 is a cross-sectional view of the centering device or mechanism shown in FIG. 4, taken substantially along the line V—V thereof.

Attention is directed to FIGS. 4 and 5 on the basis of which there will be described more fully the centering device 41. Now at a support or bearing cantilever or overhang arrangement 42 which is stationary with regard to the clamping device there is mounted for rotatable and wobble motion a first hollow shaft 44 in a friction or sliding bearing 43. By means of electrically insulating sliding bearing bushings 45 and 46 there is rotatably mounted in this hollow shaft 44 a centering shaft 47. This centering shaft 47 protrudes out of the hollow shaft 44 into a second hollow shaft 48, which, in turn, is mounted to be rotatable and lengthwise displaceable by means of sliding bearing bushings 49 and 50 at the centering shaft 47 and in relation thereto. Additionally, the hollow shaft 48 is mounted at its end remote from the hollow shaft 44, by means of a sliding or friction bearing 51, so as to be capable of rotation and performing wobble movements at a support or bearing overhang arrangement 53 which is movable in conjunction with the clamping device or assembly 15. The centering shaft 47 therefore insures that both of the hollow shafts 44 and 48 always remain exactly coaxially aligned with regard to one another.

At the mutually confronting ends there is fixedly clamped at an eccentric bushing or sleeve 58 and 59 at each hollow shaft 44 and 48 by means of the bolts 54 and 55 a pivotable or pivotal arm 56 and 57, respectively. The eccentric bushing or sleeves 58 and 59, only serving for adjustment purposes as will be described more fully hereinafter, are seated by means of their internal diameter at a stepped end portion or section 60 and 61 of the related hollow shaft 44 and 48, respectively, whereas their eccentric outer diameters engage in a bore 62 and 63 at the inner end of the related pivotal arms 56 and 57, respectively. Once the bolts 54 and 55 are tightened, then, the pivotal or pivotable arms 56 and 57 together with their related hollow shaft 44 and 48 form a rigid unit.

As best seen be referring to FIG. 5, at their free end each of the pivotal arms 56 and 57 has an essentially accurate or circular-shaped recess 64 into which there can be inserted an insertion piece or element 65 whose outer circumference or periphery exactly fits into the recess 64. The insertion piece or element 65 possesses at its circumference three outwardly, radially extending and angularly offset arranged threaded bores 66, 67 and 68. On the other hand, in the free end of each pivotal arm 56 and 57 there is provided a bore 69 leading to the recess 64 and through which bore there leads an attachment bolt 70 or equivalent structure which is selectively threaded into one of the threaded bores 66, 67 and 68. It should therefore be understood and evident that the insertion element or piece 65 can be secured in three different rotational positions in the recess 64 and as determined by the threaded bores 66, 67 and 68. This particular aspect of the inventive equipment will be further discussed hereinafter.

Now in the insert element or piece 65 itself there is formed a centering mouth 71 having for instance a substantially wedge-shaped mouth opening 71a which, in section or profile, is symmetrical and tapers and is laterally bounded by two flanks or edges 72 and 73. The profile or sectional shape of this mouth opening 71a is matched to the profile of sectional shape of the head 11' of the rail section or profile 11. Following the recess 64 there are attached at the underside of both pivotal arms 56 and 57, by means of the bolts 74 and 75, the stop or impact elements 76 and 77, respectively, whose flanks or edges 78 and 79 serve to fix the base 11" of the related rail section, and which additionally are laterally adjustable by means of the adjustment or setting screws 80 and 81, while of course first loosening the related bolt 75 and 74, respectively.

As best seen by referring to FIG. 4, welded or otherwise fixed to each hollow shaft 44 and 48 is an overhang arm or cantilever 82 and 83, respectively, at which engages a hydraulic unit 84, specifically shown in FIG. 5. Thus, each of the pivotal or pivotable arms 56 and 57 can be rocked from the work or engagement position shown in full lines in FIG. 5 into the phantom line illustrated rest position and back again.

From what has been stated above it will be apparent that the mouth opening 71a of the insert or insertion elements 65 of both pivotal arms 56 and 57 can be aligned with the greatest accuracy by rotating the corresponding eccentric bushing or sleeve 58 and 59, respectively. Furthermore, the centering shaft 47 insures that such mouth openings 71a remain in alignment with one another independent of the displacement of both pivotable arms 56 and 57 occurring during the welding operation. In the work or engagement position of the pivotal arms or levers 56 and 57 the entire profile or contour of the rail sections remains fixed by the flanks 72, 73 and the flanks 78, 79 at the endangered end regions of such rail sections which directly neighbour the welding joint 13. Hence, there is practically eliminated any possibility of a "displacement" or "distortion" of such end regions or portions, even if the abutting or impact surfaces which participate in the welding operation are not exactly perpendicular, or, both of the profile or section members possess larger deviations in shape.

Particularly when working with railroad rails it is oftentimes desired to mutually align with one another the profiles or sectional shapes of the abutting rail sections, not in accordance with the symmetry axis of each rail profile, rather in accordance with the one or other side of the profile or sectional shape of the rail head. For this purpose there are employed the three rotational positions of the insert element 65. In the rotational position shown in FIG. 5, wherein the attachment bolt 70 is threaded into the threaded bore 68, the flank 72 of the centering mouth 71 is located essentially parallel to the right side of the profile or sectional shape of the rail head 11′, whereas the flank 73 acts as an inclined surface upon the opposite side of the rail head 11′ and thus forces such into contact with the flank or edge 72. There is thus achieved an alignment of both rail profiles or sectional shapes at the "right" and the profile deviations of both rail sections appear at the "left". On the other hand, if the insert element 65 is used while being disposed in its intermediate rotational position, where the bolt 70 is threaded into the threaded bore 67, then the symmetry planes of the mouth opening 71a and the rail profile practically coincide. Both of the flanks or edges 72 and 73 work as inclined surfaces in opposition to one another at the rail head 11′. The profiles or sectional shapes of the abutting rails are thus aligned according to their symmetry plane and profile deviations appear uniformly distributed to both sides.

Finally, if the bore 66 is used for attachment of the insert elements 65, then, there is accomplished an alignment of the profile at the "left" and the profile deviations of both rail sections appear at the "right".

It will be self-evident that the profile or sectional shape of the mouth opening 71a at each exchangeable insert element 65 attached to its related pivotal arm 56 and 57 and the shape or form of the impact elements 76 and 77 and their flanks 78 and 79 should be matched or coordinated to the profile or sectional shape of the section members or rods which are to be welded together, and consideration of course should be given that there is retained the pivotability of the pivotal arms. Equally, it is deemed to be self-evident that the pivotal arms 56 and 57 are to be downwardly rocked simultaneously with or shortly after the clamping of the clamping devices or assemblies 14 and 15.

While there are shown and described present preferred embodiments of the invention, it is to be distinctly understood that the invention is not limited thereto, but may be otherwise variously embodied and practiced within the scope of the following claims. Accordingly,

What I claim is:

1. An apparatus for welding two section members by means of electrical resistance welding, especially for welding together two rails, comprising:

a respective clamping device provided for each section member;

each of said clamping devices having contact electrode means for the infeed of a welding current;

means for relatively displacing the clamping devices with respect to one another in the direction of the section members in order to exert a pressure force at a welding joint between the section members to be welded together;

a centering device arranged between the clamping devices and capable of being brought into engagement with both adjoining ends of the section members to be welded together, in order to retain in mutual alignment during the welding operation and a subsequent cooling time the profiles of both ends of the section members which directly neighbour the welding joint;

said centering device comprising two pivotal arms;

means mounting said pivotal arms for pivotal movement about an axis essentially parallel to the lengthwise direction of the section members;

each of the pivotal arms being operatively associated with one end of a related one of the section members;

each of the pivotal arms having a free end possessing a centering mouth.

2. The apparatus as defined in claim 1, wherein:
   each said centering mouth possesses a substantially wedge-shaped configuration.

3. The apparatus as defined in claim 2, wherein:
   said mounting means comprises a common pivot shaft for both pivotal arms.

4. The apparatus as defined in claim 2, further including:
   a respective insert element provided for each pivotal arm and inserted in the free end of the related pivotal arm; and
   the centering mouth of each pivotal arm being formed at the related insert element.

5. The apparatus as defined in claim 1, wherein
   the section members to be welded together comprise rail sections;
   each of said rail sections having a rail head; and
   the centering device being engageable with the rail head at the end of each of the rail sections.

6. The apparatus as defined in claim 1, further including:
   a respective insert element provided for each pivotal arm and inserted in the free end of the related pivotal arm;
   the centering mouth of each pivotal arm being formed at the related insert element;

the centering mouth of each insert element comprising two mutually converging flanks;

means enabling the insert element in each pivotal arm to be selectively fixed at any one of three different rotational positions including two extreme rotational positions and an intermediate rotational position;

each one of the flanks forming stop means for a respective side of a rail head of the rails in both extreme rotational positions, whereas in the intermediate rotational position said flanks form a wedge opening essentially symmetrical to the plane of symmetry of the rail head.

7. The apparatus as defined in claim 2, wherein:
each pivotal arm comprises a pivotal lever;
a respective hollow shaft to which there is secured a related one of each pivotal lever;
a common shaft at which there are rotatably mounted said hollow shafts.

8. The apparatus as defined in claim 7, further including:
electrically insulating bearing bushing means for mounting one of the hollow shafts at said common shaft.

9. The apparatus as defined in claim 7, further including:
means for mounting one of the hollow shafts to be lengthwise displaceable at the common shaft.

10. The apparatus as defined in claim 4, wherein:
each insert element is exchangeably inserted into its related pivotal arm.

* * * * *